United States Patent [19]
Diamond et al.

[11] 3,821,406
[45] June 28, 1974

[54] THERAPEUTIC COMPOSITIONS CONTAINING 1-SUBSTITUTED BIGUANIDES AND METHOD OF TREATING GASTROINTESTINAL DISORDERS THEREWITH

[75] Inventors: Julius Diamond, Lafayette Hill; William J. Novick, Jr., Gwynedd, Pa.

[73] Assignee: William H. Rorer Inc., Fort Washington, Pa.

[22] Filed: Mar. 2, 1970

[21] Appl. No.: 15,967

[52] U.S. Cl. ................ 424/326, 424/80, 424/156, 424/157
[51] Int. Cl. ........................................... A61k 27/00
[58] Field of Search ................................... 424/326

[56] References Cited
UNITED STATES PATENTS
2,934,535  4/1960  Sutton ........................... 260/249.9
2,961,377  11/1960  Shapiro et al ..................... 424/326

FOREIGN PATENTS OR APPLICATIONS
1,041,864  9/1966  Great Britain ..................... 424/326

OTHER PUBLICATIONS

J. Am. Chem. Soc., Vol. 81, p. 3725–3736, (1959).

Buu-Hoi et al., C. R. Acad. Sc. Paris, 930–933, (1967).

Handbook of Non-Prescription Drugs, 10–11, (1967).

Chemical Abstracts, 59, 10677, (1963).

*Primary Examiner* — Albert T. Meyers
*Assistant Examiner* — Frederick E. Waddell

[57] ABSTRACT

1-Aryl and aralkyl biguanides and their acid addition salts in suitable pharmaceutical dosage form are useful in the treatment of gastrointestinal disorders.

4 Claims, No Drawings

THERAPEUTIC COMPOSITIONS CONTAINING 1-SUBSTITUTED BIGUANIDES AND METHOD OF TREATING GASTROINTESTINAL DISORDERS THEREWITH

BACKGROUND OF THE INVENTION

1. FIELD OF THE INVENTION

This invention relates to pharmaceutical compositions and more particularly to pharmaceutical compositions useful as gastric antisecretory and spasmolytic agents, and to a method of using such compositions in therapy as gastric antisecretory and spasmolytic agents, i.e., to significantly reduce the volume and the acidity of the gastric fluid in humans and mammals.

2. DESCRIPTION OF THE PRIOR ART

Many 1-arylbiguanides and their simple acid addition salts are known. They are prepared, for instance, by reacting a corresponding arylamine hydrochloride and cyanoguanidine. For instance, SEYMOUR L. SHAPIRO, ET AL. "J.Am.Chem.Soc." vol. 81, p. 3,725 (1959) prepared numerous 1-arylbiguanides, including 1-(m-trifluoromethylphenyl) biguanide monohydrochloride. These compounds were examined for hypoglycemic activity, but they were found to be essentially devoid of this property.

BLAINE M. SUTTON, U.S. Pat. No. 2,934,535 (1960), synthesized 1(p-trifluoromethylphenyl) biguanide; 1-(o-trifluoromethylphenyl) biguanide; 1-(m-trifluoromethylphenyl) biguanide; and 1-(m-trifluoromethylphenyl) biguanide hydrochloride. These compounds were employed as chemical intermediates but not as therapeutic agents.

NHUYEN P. BUU-HOI, ET AL. "C.R.Acad.Sc.Paris" vol. 265, p. 930 (1967) synthesized a few 1-arylbiguanides including 1-(m-trifluoromethylphenyl)-biguanide and its hydrochloride. The latter compound was found to possess significant anorexigenic activity.

However, none of these and other references or patents discloses the use of compositions containing 1-(trifluoromethylphenyl) biguanides or other 1-arylbiguanides or 1-aralkylbiguanides or their acid addition salts as gastric antisecretory and spasmolytic agents in the treatment of certain gastrointestinal diseases such as duodenal ulcer and peptic ulcer.

1-Aralkyl biguanides and 1-arylbiguanides have heretofore been used or proposed for use as antidiabetics, anorexigenic, or antimalarial agents.

The pharmaceutical compositions administered heretofore as gastric antisecretory and spasmolytic drugs contain, for instance, as active agents, atropine, homatropine, propantheline bromide, dicyclomine hydrochloride, and other compounds not structurally related to 1-arylbiguanides or 1-aralkylbiguanides. Due to the anticholinergic properties of these compounds they are known to produce undesired sideeffects such as mydriasis, xerostomia, cyclopegia, and others.

Many attempts have been made to overcome these disadvantages of the known drugs for ulcer treatment, but without any noteworthy success.

SUMMARY OF THE INVENTION

It is one object of the present invention to provide valuable pharmaceutical compositions which contain, as active gastric antisecretory and spasmolytic agents, 1-phenylbiguanides or 1-phenyl lower alkyl biguanides which are substituted in the phenyl ring, or their pharmaceutically acceptable acid addition salts, said compounds being substantially free of the anticholinergic side-effects of the heretofore used gastric antisecretory and spasmolytic agents and being of low toxicity.

Another object of the present invention is to provide a simple and effective method for treating gastrointestinal disorders and diseases, such as duodenal and peptic ulcers by the preferably oral administration of compositions containing such 1-(substituted phenyl) biguanides or 1-(substituted phenyl lower alkyl)biguanides or their pharmaceutically acceptable acid addition salts.

A further object of the present invention is to provide new and valuable 1-(substituted phenyl) biguanides or 1-(substituted phenyl lower alkyl) biguanides and their pharmaceutically acceptable acid addition salts which are useful gastric antisecretory and spasmolytic agents substantially devoid of the anticholinergic side-effects of structurally unrelated known agents of this type.

Other objects of the present invention and advantageous features thereof will become apparent as the description proceeds.

In principle, the 1-substituted biguanides which are the highly effective gastric antisecretory and spasmolytic components of the pharmaceutical compositions according to the present invention, correspond to the following formula I

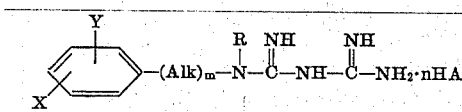

wherein

X is an electron-attracting function in o-, m-, or p-position to the biguanide group, said function being, for instance, nitro, halogen (chlorine, bromine, iodine, or fluorine), cyano, sulfamoyl, methylsulfonyl, acetyl, carbomethoxy, trichloromethyl, and preferably a polyfluoro substituted group in o- or p-position such as trifluoromethyl $F_3C$-, $\beta,\beta,\beta$-trifluorethyl $F_3C.CH_2$-, trifluoromethylsulfonyl $F_3C.SO_2$-, trifluoroacetyl $F_3C.CO$-, trifluoroacetoxy $F_3C.COO$-, trifluorocarbomethoxy $F_3C.OCO$-, di-(trifluoromethylamino) sulfonyl $(F_3C)_2N.SO_2$-, di-(trifluoromethylamino)carbonyl $(F_3C)_2N.CO$-, difluoromethyl $F_2CH$-, $\beta,\beta$-difluoroethyl $F_2CH.CH_2$-, $\alpha,\alpha$-difluoroethyl $CH_3.CF_2$-, difluoromethylsulfonyl $F_2CH.CO$-, difluoroacetoxy $F_2CH.COO$-, difluorocarbomethoxy $F_2CH.OCO$-, di-(difluoromethyl)aminosulfonyl $(F_2CH)_2N.SO_2$-, di-(difluoromethylamino)carbonyl $(F_2CH)_2N.CO$-, trifluoromethoxy $F_3CO$-, difluoromethoxy $F_2CHO$-, and $\beta,\beta$-difluorovinyl $F_2C=CH$-;

Y is hydrogen, halogen, nitro, and trifluoromethyl;

R is hydrogen, lower alkyl with one to five carbon atoms, lower alkenyl with two to five carbon atoms, cycloalkyl with three to seven carbon atoms, phenyl, benzyl, and $\alpha$-and $\beta$-phenylethyl;

Alk is straight chain or branched lower alkyl with one to four carbon atoms;

HA is an acid forming with said biguanide a pharmaceutically acceptable acid addition salt, such as an inorganic acid, for instance, hydrochloric acid, sulfuric acid, nitric acid, phosphoric acid, or an organic acid, for instance, methanesulfuric acid, ethanesulfuric acid, benzene sulfonic acid, toluene sulfonic acid, acetic acid, propionic acid, malic acid, succinic acid, tartaric acid, citric acid, ascorbic acid, benzoic acid, mandelic acid, nicotinic acid, glycine, alanine, glutamic acid, phthalic acid, the higher fatty acids such as stearic acid, oleic acid, or high molecular weight acids, for instance, abietic acid, and others;

$m$ is 0 or 1;

$n$ is 0, ⅓, ½, 1, or 2.

The term "electron-attracting function" as used herein and in the claims annexed hereto indicates any atom or group which attracts electrons more strongly than hydrogen and thus is said to have a negative inductive effect (-I). Said term of the equivalent term "electron-withdrawing group" are explained, for instance, by G. I. Brown, "An Introduction to Electronic Theories of Organic Chemistry," Longmans, Green and Co., London, pp. 68–69; by E. S. Gould, "Mechanism and Structure in Organic Chemistry," H. Holt and Co., New York, (1959), pp. 207, 218; by L. F. Fieser and M. Fieser, "Organic Chemistry," Reinhold Publishing Corporation, New York, (1956), p. 566; by J. D. Roberts and M. C. Casserio, "Basic Principles or Organic Chemistry," W. J. Benjamin, Inc., New York, (1964), pp. 802–3;

by C. R. Noller, "Textbook of Organic Chemistry," W. B. Saunders Co., Philadelphia, (1958), pp. 339–341; by L. N. Ferguson, "Modern Structural Theory of Organic Chemistry," Prentice Hall, Inc., Englewood Cliffs, New Jersey, (1963), pp. 412–416, and by other authors. Examples of such electron-attracting functions or groups are given by said authors. These explanations and examples are included by reference in the present application. The compounds of Formula I are prepared according to the processes described in the literature and patents given hereinabove on page 3 or by other known methods.

A preferred method of making such compounds consists in heating equivalent amounts of cyanoguanidine and the appropriately substituted arylamine hydrochloride or aralkylamine hydrochloride in aqueous or alcoholic systems. The reactants can also be reacted by fusing them together. The resulting hydrochloride is converted into the free biguanide by reaction with sodium hydroxide solution. The base can be converted into the desired acid addition salts by reaction with the appropriate amount of the desired acid. The reaction proceeds in principle according to the following equation:

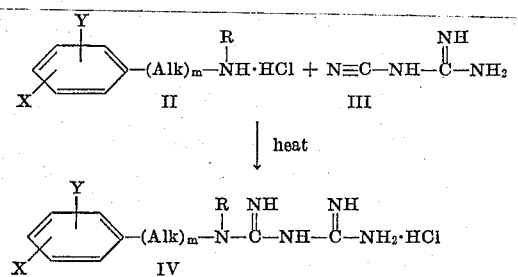

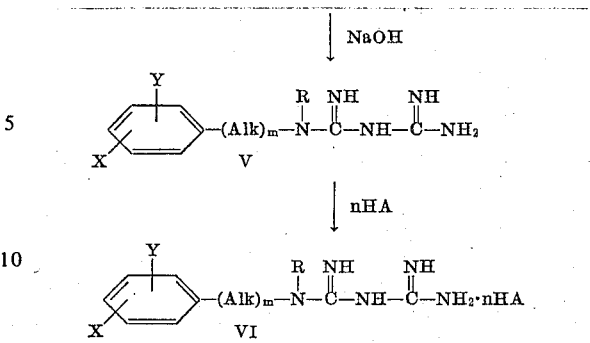

The 1-phenylbiguanides and -phenylalkylbiguanides 1-phenyl alkyl biguanides according to the present invention and their acid addition salts have been found to be highly effective gastric antisecretory agents in humans and mammals, i.e., they significantly reduce the volume and the acidity of the gastric fluid in humans and mammals. Gastric antisecretory action is produced by the oral or parenteral administration of said 1-phenylbiguanides or 1-phenylalkybiguanides or their acid addition salts according to the present invention. In general, the gastric antisecretory activity of the 1-phenylbiguanides or 1-phenylalkylbiguanides is enhanced by administering the compounds in the form of their water soluble salts. Water insoluble salts or salts difficulty soluble in water may, of course, also be used especially in order to produce prolonged therapeutic effects.

The 1-phenylbiguanides and 1-phenylalkylbiguanides according to the present invention and their acid addition salts also produce a considerable spasmolytic action on the gastrointestinal musculature, i.e., they reduce the peristaltic action of the gastrointestinal musculature which is manifested by a delay in gastric emptying time. The 1-phenylbiguanides or 1-phenylalkylbiguanides and their acid addition salts are particularly outstanding as gastric antisecretory agents because they are essentially devoid of the undesired anticholinergic properties, such as mydriasis, xerostomia, cyclopegia, etc., which characterize the known gastric antisecretory and gastro-intestinal spasmolytic compounds including atropine, homatropine, propantheline, dicyclomine. Several of the 1-phenylbiguanides and 1-phenylalkylbiguanides according to the present invention and their acid addition salts are characterized by a remarkably low acute oral toxicity in mammals.

The pharmacological properties of the 1-phenylbiguanides and 1-phenylalkylbiguanides of the present invention and their acid addition salts make them useful in the treatment of certain gastrointestinal disorders and diseases, particularly of duodenal ulcer and peptic ulcer. The utility of the 1-phenylbiguanides and 1-phenylalkylbiguanides and their acid addition salts, in treating certain gastrointestinal diseases, may be further enhanced by combining them with known antacids, such as aluminum hydroxide, magnesium hydroxide, magnesium trisilicate, aluminum glycinate, calcium carbonate, and others.

The 1-phenylbiguanides or 1-phenylalkylbiguanides or their acid addition salts preferably are administered orally in a pharmaceutical dosage form such as tablets, capsules, liquids, or they may be administered parenterally as a sterile aqueous solution buffered to a pH of 4.0 to 7.0, and made isotonic with sodium chloride. Thus the compositions according to the present invention may be in tablet or capsule dosage form and may contain excipients such as starch, lactose, cellulose, mannitol, calcium phosphate, magnesium stearate, and the like to modify physical properties thereof such as disintegration, dissolution, lubrication. The tablets may be uncoated, sugar-coated, or enteric coated, for instance, with cellulose acetate phthalate, shellac, and the like. Liquid preparations may contain flavoring agents, such as vanilla or peppermint, sweetening agents such as sugar, honey, or saccharin, and other excipients such as sorbitol, carboxymethylcellulose, polyvinylpyrrolidone, which regulate viscosity. Such pharmaceutical dosage forms are manufactured in accordance with standard pharmaceutical procedures, known in the art.

The doses administered in the treatment of gastrointestinal diseases such as duodenal or peptic ulcer may vary. In general, a unit dose between about 1 mg. and about 500 mg. is administered orally once to four times daily. The preferred unit dose is between about 10 mg. and about 100 mg.

The preferred gastric antisecretory and spasmolytic compound is 1-(p-trifluoromethylphenyl) biguanide which, on oral or parenteral administration, causes a pronounced decrease in gastric volume and acidity. Other compounds having similar activity are, for instance, 1-(p-nitrophenyl) biguanide,
1-(p-chlorophenyl) biguanide,
1-(o-chlorophenyl) biguanide,
1-(o-fluorophenyl) biguanide,
1-(o-trifluoromethylphenyl) biguanide,
1-(m-trifluoromethylphenyl) biguanide,
1-(p-cyanophenyl) biguanide,
1-(p-difluoromethylsulfonylphenyl) biguanide,
1(o-difluoromethylaminosulfonylphenyl) biguanide, 1-(p-trifluoromethoxyphenyl) biguanide,
1-(p-trifluoromethylbenzyl) biguanide,
1-[α-methyl-p-trifluoromethylbenzyl]biguanide,
1-[β-(p-trifluoromethylphenyl)ethyl]biguanide,
1-(4-nitro-2-trifluoromethylphenyl) biguanide,
1-(3-nitro-4-trifluoromethylphenyl) biguanide,
1-(4-fluoro-2-trifluoromethylphenyl) biguanide,
1-(4-fluoro-3-trifluoromethylphenyl) biguanide,
1-(2-fluoro-5-trifluoromethylphenyl) biguanide,
1-(2-bromo-5-trifluoromethylphenyl) biguanide,
1-(2-chloro-5-trifluoromethylphenyl) biguanide,
1-(4-chloro-3-trifluoromethylphenyl) biguanide,
1-(p-trifluoroacetylphenyl) biguanide,
1-(p-trifluorosulfonylphenyl) biguanide,
1-(4-bromo-3-trifluoromethylphenyl) biguanide,
1-(2-chloro-5-trifluoromethylphenyl) biguanide,
1-(p-difluoroacetylphenyl) biguanide,
1-(4-bromo-2-trifluoromethylphenyl) biguanide and others.

Of the 1-phenyl lower alkyl biguanides of Formula I those compounds have proved to be preferred in which the lower alkyl is a saturated lower alkyl with one or two carbon atoms, i.e., the 1-(substituted benzyl) biguanides and the 1-(substituted phenylethyl) biguanides.

Preferred salts of the biguanides according to the present invention are those with hydrochloric acid, sulfuric acid, phosphoric acid, acetic acid, citric acid. These salts correspond to the following formulas wherein B indicates the respective biguanide.

| | |
|---|---|
| 1-substituted biguanide hydrochloride | B.1 HCl |
| 1-substituted biguanide dihydrochloride | B.2 HCl |
| 1-substituted biguanide hydrogen sulfate | B.1 $H_2SO_4$ |
| 1-substituted biguanide sulfate | B.1/2 $H_2SO_4$ |
| 1-substituted biguanide dihydrogen phosphate | B.1 $H_3PO_4$ |
| 1-substituted biguanide hydrogen phosphate | B.1/2 $H_3PO_4$ |
| 1-substituted biguanide phosphate | B.1/3 $H_3PO_4$ |
| 1-substituted biguanide acetate | B.1 $CH_3COOH$ |

Salts with other mono- or polyvalent acids can, of course, also be used provided they are pharmaceutically acceptable and substantially non-toxic.

DESCRIPTION OF THE PREFERRED EMBODIMENTS

The preparation of new compounds according to the present invention is described more in detail in the following examples but is not limited thereto. Other compounds are prepared in a similar manner or by other suitable methods.

Example 1

1-(p-Trifluoromethoxyphenyl) biguanide dihydrochloride

A stirred mixture of 6.3 g. (0.0296 mole) of p-aminophenyltrifluoromethyl ether hydrochloride and 2.49 g. (0.0296 mole) of cyanoguanidine was immersed in a 210°C. oil bath for 15 minutes. The resulting amber glasslike reaction product was dissolved in 100 ml. of water, alkalized with 40 percent sodium hydroxide solution, and extracted with 250 ml. of ether. The ether layer was backwashed twice with 10 ml. of water, dried over sodium carbonate, filtered, and the ether solution was made strongly acidic with a saturated etheral hydrochloric acid solution. The white precipitate was collected on a filter, washed twice with 50 ml. of anhydrous ether, and dried at 25°C./125 mm. Yield: 7.5 g. (72.3 percent), m.p. 200°–208°C. dec. Recrystallization from a mixture of isopropanol and cyclohexane (1:1) gave 3.7 g. (35.7 percent) of the dihydrochloride, m.p. 209°–11°C. dec. TLC (silica gel) 45 isopropanol: 30 ethylacetate: 17 diethylamine: 8 $H_2O$. $R_f = 0.29$ Analysis
Calculated for $C_9H_{12}Cl_2F_3N_5O$: C=32.35, H=3.62, N=20.96
Found : C=32.18, H=3.41, N=20.83

Example 2

1-(p-Trifluoromethylbenzyl) Biguanide Dihydrochloride

A stirred mixture of 6.9 g. (0.035 mole) of p-trifluoromethylbenzylamine hydrochloride and 2.9 g. (0.035 mole) of cyanoguanidine was immersed in a 180°C. oil bath for 1 hour. The melt was cooled and dissolved in 35 ml. of hot water. The solution was cooled in an ice bath, made alkaline with 40 sodium hydroxide solution, and extracted with 150 ml. of ether. The ether layer was dried over potassium carbonate, filtered and the ether solution was made strongly acidic with a saturated ethereal hydrochloric acid solution. The while precipitate was washed twice with 25 ml. of anhydrous ether. Yield: 6 g. (51 percent) of dihydrochloride, m.p. 195°–200°C. dec. The salt was recrystallized three times from a mixture of ethanol and heptane (3:5). Yield after drying at 50°C./0.1 mm. for 5 hours: 1.8 g. (15.5 percent) of the white crystalline dihydrochloride, m.p. 223°–225°C. TLC (silica gel) 20 isopropanol: 1.5 ammonia (28 percent) $R_f = 0.22$.

| Analysis | | |
|---|---|---|
| Calculated for | $C_{10}H_{14}Cl_2F_3N_5$: | C=36.16, H=4.25, N=21.09 |
| Found | | C=36.87, H=4.38, N=20.70 |

Example 3

1-(α-Methyl-p-Trifluoromethylbenzyl) Biguanide Dihydrochloride

A stirred mixture of 15.5 g. (0.0687 mole) of α-methyl-p-trifluoromethylbenzylamine hydrochloride and 6.35 g. (0.0756 mole) of cyanoguanidine was immersed in a 190°C. oil bath for 10 minutes. The melt was cooled to room temperature, dissolved in 100 ml. of water, made alkaline with 40 percent sodium hydroxide solution and extracted twice with 200 ml. of ether. The combined ether extracts were dried over potassium carbonate, filtered, and the ether solution made strongly acidic with a saturated ethereal hydrochloric acid solution. The precipitate was collected on a filter, washed twice with 50 ml. of anydrous ether, and dried at 40° C./125 mm. for 5 hours. Yield: 14.5 g. (61 percent) of the buff colored dihydrochloride, m.p. 110°–120° C. The dihydrochloride was dissolved in 50 ml. of water, made strongly alkaline with 40 percent sodium hydroxide solution, and extracted twice with 100 ml. of ether. The combined ether extracts were dried over potassium carbonate, filtered, and the ether solution was made strongly acidic with a saturated ethereal hydrochloric acid solution. The precipitate was collected on a filter, washed twice with 50 ml. of anhydrous ether, and dried at 40° C./125 mm. for 5 hours. Yield: 12 g. (50.5 percent) of the pure dihydrochloride.

Example 4

1-[β-(p-Trifluoromethylphenyl) ethyl]biguanide dihydrochloride

A stirred mixture of 16.9 g. (0.1 mole) of p-trifluoromethylphenethylamine hydrochloride and 8.4 g. (0.1 mole) of cyanogluanidine was immersed in a 210° C. oil bath for 15 minutes. The melt was cooled and dissolved in 150 ml. of hot water. The solution was cooled in an ice bath, made alkaline with 40 percent sodium hydroxide solution, and extracted twice with 250 ml. of ether. The ether layer was dried over potassium carbonate, filtered, and the ether solution was made strongly acidic with a saturated ethereal hydrochloric acid solution. The white precipitate was washed twice with 75 ml. of anhydrous ether. Yield: 12.8 g. (54 percent) of the dihydrochloride.

When using, in place of p-aminophenyltrifluoromethyl ether hydrochloride, equivalent amounts of the following amino compounds and proceeding otherwise as described in Example 1, the following compounds are obtained:

| Example No. | Amino compound reactant | Reaction product with cyanoguanidine |
|---|---|---|
| 5 | p-Amino-α,α,α-trifluoroacetophenone hydrochloride | 1-(p-Trifluoroacetylphenyl) biguanide hydrochloride |
| 6 | p-Aminophenyl-α,α,α-trifluoromethylsulfone hydrochloride | 1-(p-Trifluorosulfonylphenyl) biguanide hydrochloride |
| 7 | di-3,5,-Trifluoromethylaniline hydrochloride | 1-(di-3,5,-Trifluoromethylphenyl) biguanide hydrochloride |
| 8 | 5-Amino-2-bromobenzotrifluoride hydrochloride | 1-(4-Bromo-3-trifluoromethylphenyl) biguanide hydrochloride |
| 9 | 3-Amino-2-chlorobenzotrifluoride hydrochloride | 1-(2-Chloro-5-trifluoromethylphenyl) biguanide hydrochloride |
| 10 | p-Amino-α,α-difluoroacetophenone hydrochloride | 1-(p-Difluoroacetylphenyl) biguanide hydrochloride |
| 11 | 2-Amino-5-bromobenzotrifluoride hydrochloride | 1-(4-Bromo-2-trifluoromethylphenyl) biguanide hydrochloride |
| 12 | 2-Amino-5-nitrobenzotrifluoride hydrochloride | 1-(4-Nitro-2-trifluoromethylphenyl) biguanide hydrochloride |
| 13 | 4-Amino-3-nitrobenzotrifluoride hydrochloride | 1-(3-Nitro-4-trifluoromethylphenyl) biguanide hydrochloride |
| 14 | 2-Amino-5-fluorobenzotrifluoride hydrochloride | 1-(4-Fluoro-2-trifluoromethylphenyl) biguanide hydrochloride |
| 15 | 5-Amino-2-fluorobenzotrifluoride hydrochloride | 1-(4-Fluoro-3-trifluoromethylphenyl) biguanide hydrochloride |
| 16 | 3-Amino-4-fluorobenzotrifluoride hydrochloride | 1-(2-Fluoro-5-trifluoromethylphenyl) biguanide hydrochloride |
| 17 | 3-Amino-4-bromobenzotrifluoride hydrochloride | 1-(2-Bromo-5-trifluoromethylphenyl) biguanide hydrochloride |
| 18 | 2-Amino-5-chlorobenzotrifluoride hydrochloride | 1-(2-Chloro-5-trifluoromethylphenyl) biguanide hydrochloride |
| 19 | 5-Amino-2-chlorobenzotrifluoride hydrochloride | 1-(4-Chloro-3-trifluoromethylphenyl) biguanide hydrochloride |

Example 20

15.0 g. (0.0896 mole) of N-methyl-p-nitroaniline hydrochloride and 6.68 g. (0.0796 mole) of cyanoguanidine were immersed in a 180° C. oil bath for 10 minutes. The reaction mixture was worked up as described in Example 1 whereby, however, the resulting ether solution of the reaction product was evaporated to dryness. The residue was triturated with heptane to yield 9.5 g. of the crude 1-methyl-1-(p-nitrophenyl) biguanide. Said base was purified by trituration with boiling chloroform to yield 3.1 g. of the pure base, m.p. 195°–196° C. Its hydrochloride was prepared by dissolving the base in ether and introducing gaseous hydrogen chloride thereinto. The precipitated hydrochloride was collected.

The following compounds of Formula I with a substituent R were prepared in an analogous manner from the respective amino compound reactants and cyanoguanidine.

| Example No. | Amino compound reactant | Reaction product with cyanoguanidine |
|---|---|---|
| 21 | 3,5-Di-(trifluoromethyl)aniline hydrochloride | 1-(Di-3,5-trifluoromethylphenyl)biguanide hydrochloride |

-Continued

| Example No. | Amino compound reactant | Reaction product with cyanoguanidine |
|---|---|---|
| 22 | p-Methylaminobenzotrifluoride hydrochloride | 1-Methyl-1-(p-trifluoromethylphenyl)biguanide |
| 23 | N-Phenyl-α,α,α-trifluoro-m-toluidine hydrochloride | 1-Phenyl-1-(m-trifluoromethylphenyl) biguanide |
| 24 | N-Allyl-p-chloroaniline hydrochloride | 1-Allyl-1-(p-chlorophenyl) biguanide |
| 25 | N-Cyclohexyl-p-bromoaniline hydrochloride | 1-Cyclohexyl-1-(p-bromophenyl) biguanide |
| 26 | o-Benzylamino benzotrifluoride hydrochloride | 1-Benzyl-1-(o-trifluoromethylphenyl) biguanide |
| 27 | N-Cyclopentyl-p-trifluoromethylaniline hydrochloride | 1-Cyclopentyl-1-(p-trifluoromethylphenyl) biguanide |
| 28 | N-(p-Nitrophenyl)-N-(β-phenylethyl)amine hydrochloride | 1-β-Phenylethyl-1-(p-nitrophenyl) biguanide |

Acid addition salts of the biguanide compounds are prepared in a manner known per se as shown, for instance, in the following examples.

Example 29

1-(p-Trifluoromethylphenyl) biguanide citrate

The biguanide base is reacted with ⅓ equivalent of citric acid in absolute ethanol. The citrate is precipitated by dilution with anhydrous diethyl ether.

Example 30

1-(p-Trifluoromethylphenyl) biguanide hydrogen phthalate

The biguanide base is reacted with one equivalent of phthalic acid in absolute ethanol. The hydrogen phthalate is precipitated by dilution with anhydrous diethyl ether.

Example 31

1-(p-Trifluoromethylphenyl) biguanide methanesulfonate

The biguanide case is reacted with one equivalent of methanesulfuric acid in absolute ethanol. The solvent is removed under pressure and the residue is triturated with anhydrous diethyl ether.

Example 32

1-(p-Trifluoromethylphenyl) biguanide stearate

The biguanide base is reacted with one equivalent of stearic acid in absolute diethyl ether. The solvent is removed under reduced pressure and the residue is triturated with water.

Example 33

1-(p-Trifluoromethylphenyl) biguanide acetate

The biguanide base is reacted with one equivalent of acetic acid in absolute diethyl ether and the solvent is removed under reduced pressure.

Pharmaceutical preparations as they are used in therapy according to the present invention are produced according to the following examples without, however, being limited thereto.

Example 34

Composition:

150 g. of 1-(p-trifluoromethylphenyl) biguanide hydrochloride, 3 g. of magnesium stearate, 2 g. of finely divided silica sold under the trademark CAB-O-SIL by Godfrey L. Cabot, Inc., Boston, Mass., and 345 g. of lactose.

The ingredients are thoroughly mixed with each other and the mixture is filled in gelatin capsules. Each capsule contains 500 mg. of the composition and thus 150 mg. of 1-(p-trifluoromethylphenyl) biguanide hydrochloride.

Example 35

Composition:

100 g. of 1-(p-trifluoromethylphenyl) biguanide nitrate, 20 g. of corn starch, 14 g. of calcium carbonate, and 1 g. of magnesium stearate.

The active compound and the starch are thoroughly mixed, moistened with a 10% gelatin solution, and granulated by pressing through a 190 20 sieve. The granules are dried, thoroughly mixed with calcium carbonate and magnesium stearate, and compressed into tablets, each weighing about 135 mg. and containing 100 mg. of 1-(p-trifluoromethyl) biguanide nitrate.

Example 36

Composition:

75 g. of 1-(p-trifluoromethylphenyl) biguanide, 50 g. of microcrystalline cellulose, 10 g. of polyvinylpyrrolidone, 5 g. of magnesium stearate, and 85 g. of starch.

The active compound and cellulose are intimately mixed, moistened with a polyvinylpyrrolidone solution in water, and granulated by pressing through a 190 10 sieve. The dried granules are mixed with starch and magnesium stearate and are compressed to dragee cores, each weighing 225 mg. The cores are now provided with an elastic subcoat of an aqueous sugar solution containing 60 g. of powdered acacia, 60 g. of powdered gelatin, and 600 g. of sugar per liter of solution. Thereafter a dusting powder mixture of 180 g. of powdered sugar, 60 g. of powdered starch, 1 g. of powdered talc, and 1 g. of powdered acacia is applied to the dragee cores. Coating with the gelatin subcoat and dusting are repeated about five times. The thus treated cores are sugar coated in the coating pan with a 60 percent sugar solution. Sugar coating is repeated until each dragee weighs about 400 mg.

Example 37

Enteric Coated Tablets

The tablets of example 36 are prepared by using concave punches for compressing the mixture to cores and the cores are subsequently coated with cellulose acetate phthalate solution in methyl acetate containing about 5 percent of diethylphthalate as plasticizer, calculated for cellulose acetate phthalate, to produce an enteric coated tablet which is subsequently sugar-coated. Application of the enteric coating material is effected by spraying the solution of the enteric agent onto the core surface or by pouring a concentrated solution of the enteric agent onto the tablet surface using conventional pharmaceutical tablet coating techniques. The solvent is removed by heating. In place of cellulose acetate phthalate there may, of course, be used other enteric coating materials such as shellac, zein, or the like, and, if required, other plasticizers.

Example 38

Composition:
50 g. of 1-(p-trifluoromethylphenyl) biguanide citrate,
200 g. of dried magnesium hydroxide gel,
200 g. of dried aluminum hydroxide gel,
5 g. of magnesium stearate,
40 g. of mannitol, and
5 ml. of peppermint oil.

1-(p-Trifluoromethylphenyl) biguanide citrate, magnesium hydroxide, and aluminum hydroxide are granulated as described in Example 35, mixed with magnesium stearate, mannitol, and peppermint oil, and compressed to tablets, each weighing 500 mg.

Example 39

Composition:
50 g. of 1-(p-trifluoromethylphenyl) biguanide hydrochloride,
200 g. of magnesium hydroxide gel,
200 g. of aluminum hydroxide gel,
240 g. of sorbitol,
10 g. of methyl p-hydroxybenzoate, and
q.s. 5000 cc. of distilled water.

The ingredients are intimately dissolved and suspended in the distilled water. Flavoring agent may be added thereto if desired. 5 cc. of the resulting suspension contain 50 mg. of 1-(p-trifluoromethylphenyl) biguanide hydrochloride, 200 mg. of magnesium hydroxide, and 200 mg. of aluminum hydroxide.

Example 40

50 g. of 1-(p-trifluoromethylphenyl) biguanide acetate,
5 g. of propyl p-hydroxybenzoate
are dissolved and diluted to 5,000 cc. with twice distilled water after the addition of modified Srensen buffer solution in an amount sufficient to adjust the pH-value to a pH of 6.0. Sodium chloride is dissolved therein in an amount sufficient to render the resulting solution isotonic. The final solution is passed through a bacteriological filter and the filtrate is autoclaved at 120° C. for 15 minutes to yield a parenterally applicable solution which contains 50 mg. of 1-(p-trifluoromethylphenyl) biguanide acetate in 5 cc.

Of course, in place of 1-(p-trifluoromethylphenyl) biguanide and its salts used in the above given examples, there may be employed other acid addition salts of said compound or other gastric antisecretory and spasmolytic compounds according to Formula I. Other known compounding methods and other excipients than those described hereinabove may also be used.

The amounts of active 1-(substituted phenyl or phenyl alkyl) biguanide in said preparations may be varied. Solid compositions, such as tablets (uncoated, sugar-coated, enteric coated), dragees, capsules, and the like may contain between 1 mg. and 500 mg. of the active agent per dosage unit while the liquid preparations may contain between 10 mg. and 100 mg. of said active agent per dosage unit of 5 cc. The parenterally administrable solutions contain preferably between 5 mg. and 100 mg. per 5 cc.

PHARMACOLOGICAL DATA

The effect of the compounds of Formula I on gastric secretion, their spasmolytic effect, their mydriatic effect, and their toxicity were tested on animals. The results of these tests are given hereinafter:

a. Gastric Secretion Test (Rat):

Rats were fasted for 48 hours, water was given ad lib. The rats were selected at random and separated into groups of 10. The animals were treated intraduodenally (I.D.) with the test compound or the vehicle immediately subsequent to the ligation of the stomach at the pyloric sphincter (Shay rat). The animals were sacrificed with chloroform at 4 hours post-drug administration, the stomach was removed and its contents was assayed for volume, pH, and total acids.

RESULTS

| | Test Compound at 50 mg./kg.I.D. | |
|---|---|---|
| Substituent in biguanide | Decrease in Gastric Volume | Decrease in Gastric Acidity |
| $p-NO_2C_6H_4-$ | 71% | 72% |
| $p-Cl \cdot C_6H_4-$ | 49% | 37% |
| $p-CF_3 \cdot C_6H_4-$ | 90% | 91% |
| $o-CF_3 \cdot C_6H_4-$ | 60% | 72% |
| $m-CF_3 \cdot C_6H_4-$ | 63% | 41% |
| $o-Cl \cdot C_6H_4-$ | 62% | 39% |
| $o-F \cdot C_6H_4-$ | 47% | 34% |
| $p-NC \cdot C_6H_4-$ | 54% | 47% |
| $p-F_3CO \cdot C_6H_4-$ | 72% | 78% |
| | Test Compound at 40 mg./kg.I.D. | |
| $p-F_3C \cdot C_6H_4 \cdot CH_2-$ | 40% | 43% | b. Gastric Secretion Test (Dog):

(Handbook of Physiology, Section 6: Alimentary Canal, Volume II: Secretion. American Physiology Society, Washington, D.C., 1967.)

Female pure-bred beagles were prepared with chronic gastric fistula. Eighteen hours fasted animals were given stimulating doses of 2-deoxy-D-glucose, pentagastrin, or histamine. Gastric juice secretion was measured for 2 to 3 hours with half-hour measurements of volume, pH, and total acid. The test procedure was repeated to establish control secretions for each stimulant. Pre-treatment with 1-(p-trifluoromethylphenyl) biguanide subcutaneously reduced the volume and total acid of gastric juice secretion.

RESULTS

| 1-(p-Trifluoromethylphenyl) biguanide Gastric Stimulant | | Dose of | | | |
|---|---|---|---|---|---|
| | | 25 mg./kg. | 12.5 mg./kg. | 6.25 mg./kg. | 3.125 mg./kg. |
| 2-Deoxy-D-glucose | X % decrease total acid* | 43.0 | 62.2 | 48.2 | 60.9 |
| | X % decrease volume | 0 | 22.4 | 48.5 | 54 |
| Pentagastrin | X % decrease total acid | 47.5 | 64.3 | 27.8 | |
| | X % decrease volume | 0 | 0 | 0 | |
| Histamine | X % decrease total acid | 26.5 | 53.6 | 27.2 | |
| | X % decrease volume | 0 | 22.9 | 6.6 | |

*Average of four doors per dose c. Anti-Ulcer Test:

Male Wistar rats (130–150 grams) are fasted for 24 hours, then given reserpine at 5 mg./kg. i.p. Twenty-four hours later, the stomachs are removed and examined for ulceration. Ulcers are graded on a 0–4 scale and the number of ulcers is recorded. Treatment with 1-(p-trifluoromethylphenyl) biguanide at 25 mg./kg. or 50 mg./kg. s.c. produced a decrease in ulcer grade and the number of ulcers compared to control reserpine-treated rats.

RESULTS

| Dose of 1-(p-trifluoromethylphenyl) biguanide | Decrease in Ulcer Grade | Decrease in number of ulcers |
| --- | --- | --- |
| 25 mg./kg. | 19.2% | 41.7% |
| 50 mg./kg. | 60.3% | 75.0% | d. Spasmolytic Test:

(D. A. Brodie, and S. K. Kundrats, "Effect of Drugs on Gastric Emptying in Rats," Fed. Proc. 24:714, 1965.)

Rats were pretreated with varying doses of 1-(p-trifluoromethyl phenyl) biguanide 30 minutes prior to the insertion of 30 AMBERLITE resin pellets (Size 16) into the stomach via a polyethylene tube. Two hours after pellet administration the rats were sacrificed and the stomachs were removed subsequent to both pyloric and esophageal ligation. The remaining pellets were counted and the percentage retention of pellets was calculated. For 1-(p-trifluoromethylphenyl) biguanide, the $ED_{50}$ was <20 mg./kg. s.c.

e. Mydriasis Test:

(R. A. Turner, "Screening Methods in Pharmacology," Academic Press, New York and London, pp. 174–175, 1965.)

Ten rats per group were given the test compound at the appropriate pretreatment time and were subjected to pupillary observation with a stereoscopic microscope at 10X. Positive response of mydriasis was determined by an increase in pupil diameter over 6 units on an ocular micrometer scale. With 1-(p-trifluoromethylphenyl) biguanide no mydriasis was observed at doses as high as 200 mg./kg. orally.

f. Acute Toxicity (mice):

Albino male mice (18–24 g.) were separated into groups of 10 and given the test compounds orally. Observations were made for overt toxic effects and death during a 5-day period. The $LD_{50}$ was calculated according to the method of Litchfield-Wilcoxon. For 1-(p-trifluoromethylphenyl) biguanide, the oral $LD_{50}$ is 555 mg./kg.

g. Acute Toxicity (Rats):

Male Wistar rats (120–160 g.) were separated into groups of 10 and were given the test compounds orally. Observations were made for overt toxic effects and death during a five-day period. The $LD_{50}$ was calculated according to the method of Litchfield and Wilcoxon. For 1-(p-trifluoromethylphenyl) biguanide, the oral $LD_{50}$ is 600 mg./kg.

These pharmacological data clearly prove the excellent gastric antisecretory and spasmolytic activity as well as the substantial absence of mydriatic side-effects and the low toxicity of the claimed compounds and especially of 1-(p-trifluoromethylphenyl) biguanide. It may be mentioned that these animal tests are accepted by the art as appropriately correlated with human utility.

Oral or parenteral administration of the compositions according to the present invention to human patients suffering from duodenal or peptic ulcers have confirmed these animal tests.

We claim:

1. A method for treating gastrointestinal hyperacidity or ulceration in a human or mammal comprising administering thereto between 1 mg and 500 mg orally or between 5 mg and 100 mg parenterally of 1-(di-3,5-trifluoromethylphenyl)biguanide.

2. A method for treating gastrointestinal hyperacidity or ulceration in a human or mammal comprising administering thereto between 1 mg and 500 mg orally or between 5 mg and 100 mg parenterally of 1-(4-bromo-2-trifluoromethylphenyl)biguanide.

3. A method for treating gastrointestinal hyperacidity or ulceration in a human or mammal comprising administering thereto between 1 mg and 500 mg orally or between 5 mg and 100 mg parenterally of 1-(4-chloro-3-trifluoromethylphenyl)biguanide.

4. A method of treating gastrointestinal hyperacidity or ulceration in a human or mammal which comprises orally administering thereto about 10–100 mg. of 1-(p-trifluoromethylphenyl) biguanide.

* * * * *